No. 879,636. PATENTED FEB. 18, 1908.
E. J. HARRISON.
TROLLEY WHEEL.
APPLICATION FILED JULY 18, 1907.
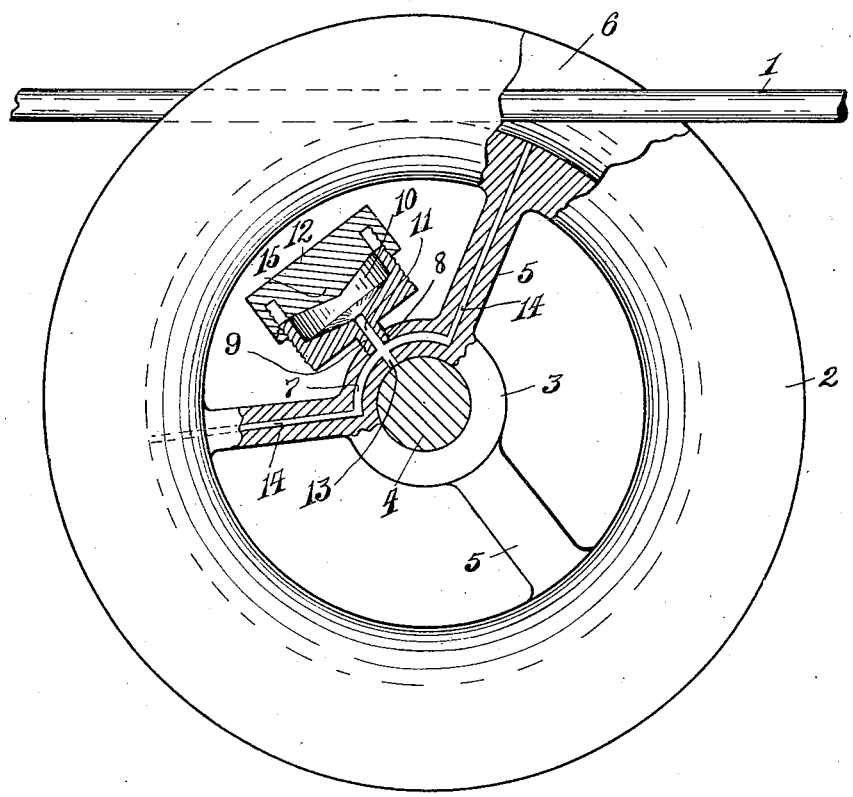
Witnesses:
George Oltsch
G. M. Cole.
Edward J. Harrison
Inventor

UNITED STATES PATENT OFFICE.

EDWARD J. HARRISON, OF SOUTH BEND, INDIANA.

TROLLEY-WHEEL.

No. 879,636.  Specification of Letters Patent.  Patented Feb. 18, 1908.

Application filed July 18, 1907. Serial No. 384,421.

*To all whom it may concern:*

Be it known that I, EDWARD J. HARRISON, a citizen of the United States, residing at South Bend, in the county of St. Joseph and State of Indiana, have invented certain new and useful Improvements in Trolley-Wheels, of which the following is a specification.

This invention relates to trolley wheels.

One object of the invention is to provide a trolley wheel embodying such characteristics that it and the trolley wire may be continuously supplied with a lubricant to reduce the friction between the wheel and wire and diminish the wear of these parts.

Another object of the invention resides in the provision of a trolley wheel having means to supply a lubricant to the trolley wire for the purpose hereinbefore set forth and for the further purpose of preventing ice from forming upon the under surface of the trolley without impairing the normal conductivity of the current from the wire into the trolley wheel.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages thereof.

In the accompanying drawings, 1 illustrates a trolley wire with which coöperates a trolley wheel embodying my invention, the trolley wheel being shown partly in elevation and partly in section.

Referring now more particularly to the accompanying drawings, the reference character 1 indicates a trolley wire and 2 a trolley wheel provided as usual with a hub 3 adapted to work upon the axis 4, there being a series of spokes 5 radiating from the hub 3 to the grooved flanged portion 6 of the wheel, the trolley wire 1 fitting in the grooved flanged portion 6 in the usual manner.

The hub 3 of my improved wheel is provided with an arcuate recess 7 provided with a screw threaded opening 8 through the periphery of the hub in which fits the reduced screw threaded portion 9 of the lubricant cup 10, there being a passage 11 leading from the interior of the cup through said reduced screw threaded portion 9 to the arcuate recess 7, so that lubricant (not shown) confined within the cup 10 may be forced from the latter by operating the closure 12 through the passage 10 into said recess 7. The lubricant may pass from the recess 7 through the duct 13 to the axis 4 and also through the ducts 14 extending through two or more of the spokes 5 of the wheel to the grooved flanged portion 6 of the wheel from which latter it may be supplied to the trolley wire 1 for the purpose of reducing the friction between the wheel and wire and also to diminish the wear between the wheel and wire and to prevent the formation of ice upon the wire without necessarily impairing the electrical connection between the wire and the wheel.

It will now be understood that the lubricant is preferably of a semi-solid consistency and that it is forced from the cup 10 by the closure 12 provided with a cone portion 15 adapted to insure forcing of the lubricant into the recess 7. When the lubricant reaches the recess 7 the continued rotation of the wheel 6 under the propulsion of the car (not shown) will cause the axis 4 and the periphery of the wheel to be supplied with the lubricant. Since the periphery of the wheel is supplied with the lubricant it necessarily follows that the lubricant will be given to the trolley wire, and in the use of a large number of cars continuously passing over a given territory, and using my improved wheel, the trolley wire will be well lubricated with exceptional advantages in cold weather, as the oil will positively prevent ice from forming under the lower surface of the trolley.

What is claimed is:—

1. A trolley wheel including a flanged periphery and hub, a recess formed in the hub, a lubricant cup mounted upon the hub and communicating with said recess, and ducts communicating with the recess and leading to the periphery of the wheel.

2. The combination with a trolley wire and trolley wheel, the wheel having a recess and communicating ducts leading to the periphery of the wheel, of a lubricant cup carried by the wheel and communicating with said recess.

3. The combination with a trolley wire and a trolley wheel, the wheel including a hub provided with a recess, and communicating ducts between the recess and periphery of the wheel, the ducts being formed in spokes of the wheel, of a lubricant cup carried by the wheel and communicating with said recess.

In testimony whereof I have signed my name to this specification in the presence of two subscribing witnesses.

EDWARD J. HARRISON.

Witnesses:
  GEORGE OLTSEL,
  G. M. COLE.